US008721780B2

(12) United States Patent
Koganehira et al.

(10) Patent No.: US 8,721,780 B2
(45) Date of Patent: May 13, 2014

(54) INK COMPOSITION

(75) Inventors: Shuichi Koganehira, Matsumoto (JP); Shinichi Yamamoto, Matsumoto (JP)

(73) Assignee: Seiko Epson Corporation (JP)

( * ) Notice: Subject to any disclaimer, the term of this patent is extended or adjusted under 35 U.S.C. 154(b) by 271 days.

(21) Appl. No.: 13/232,271

(22) Filed: Sep. 14, 2011

(65) Prior Publication Data

US 2012/0073468 A1  Mar. 29, 2012

(30) Foreign Application Priority Data

Sep. 28, 2010  (JP) ................. 2010-217276

(51) Int. Cl.
*C09D 11/14*  (2006.01)

(52) U.S. Cl.
USPC ............... 106/31.36; 106/31.58; 106/31.68; 106/31.86

(58) Field of Classification Search
USPC ............. 106/31.36, 31.58, 31.68, 31.86
See application file for complete search history.

(56) References Cited

U.S. PATENT DOCUMENTS

| | | | |
|---|---|---|---|
| 6,715,868 B2 | 4/2004 | Schmidt et al. | |
| 7,229,489 B2 * | 6/2007 | Yatake ................. | 106/31.58 |
| 7,332,023 B2 | 2/2008 | Rehman et al. | |
| 7,537,652 B2 * | 5/2009 | Koganehira et al. ....... | 106/31.58 |
| 7,553,360 B2 * | 6/2009 | Koganehira et al. ....... | 106/31.58 |
| 7,686,876 B2 * | 3/2010 | Koganehira et al. ....... | 106/31.58 |
| 7,955,425 B2 * | 6/2011 | Koganehira et al. ....... | 106/31.58 |
| 8,021,472 B2 * | 9/2011 | Koganehira et al. ....... | 106/31.58 |
| 8,105,427 B2 * | 1/2012 | Koganehira et al. ....... | 106/31.58 |
| 8,110,033 B2 * | 2/2012 | Mizutani et al. .......... | 106/31.58 |
| 2003/0106462 A1 | 6/2003 | Yatake et al. | |
| 2004/0020407 A1 | 2/2004 | Kato | |
| 2005/0176848 A1 | 8/2005 | Chen et al. | |
| 2005/0235870 A1 * | 10/2005 | Ishihara ................. | 106/31.58 |
| 2007/0040880 A1 * | 2/2007 | Jackson et al. ............ | 106/31.68 |
| 2007/0247504 A1 | 10/2007 | Koganehira et al. | |
| 2008/0233363 A1 | 9/2008 | Goto | |
| 2009/0176071 A1 | 7/2009 | Koganehira et al. | |
| 2009/0297716 A1 | 12/2009 | Koganehira et al. | |
| 2010/0080962 A1 | 4/2010 | Koganehira et al. | |
| 2010/0086685 A1 * | 4/2010 | Mizutani et al. .............. | 427/256 |
| 2010/0087595 A1 * | 4/2010 | Koganehira et al. .......... | 524/612 |
| 2010/0289848 A1 | 11/2010 | Koganehira et al. | |
| 2010/0321430 A1 * | 12/2010 | Koganehira et al. ............. | 347/9 |
| 2011/0118399 A1 * | 5/2011 | Koganehira et al. .......... | 524/377 |
| 2011/0192317 A1 * | 8/2011 | Koganehira .................. | 106/31.9 |
| 2011/0265686 A1 * | 11/2011 | Koganehira et al. ....... | 106/31.13 |
| 2012/0073468 A1 * | 3/2012 | Koganehira et al. ....... | 106/31.13 |
| 2012/0227619 A1 * | 9/2012 | Koganehira et al. ....... | 106/31.13 |
| 2012/0227620 A1 * | 9/2012 | Koganehira et al. ....... | 106/31.13 |

FOREIGN PATENT DOCUMENTS

| | | |
|---|---|---|
| JP | 11-080629 | 3/1999 |
| JP | 2003-213179 A | 7/2003 |
| JP | 2003-253167 A | 10/2003 |
| JP | 2004-526019 A | 8/2004 |
| JP | 2005-194500 A | 7/2005 |
| JP | 2005-226073 A | 8/2005 |
| JP | 2006-249429 A | 9/2006 |
| JP | 2007-277342 A | 10/2007 |
| JP | 2009-506166 A | 2/2009 |
| JP | 2009-209338 A | 9/2009 |
| JP | 2009-209339 A | 9/2009 |
| JP | 2009-209340 A | 9/2009 |
| WO | WO-02066565 A1 | 8/2002 |
| WO | WO-2007024834 A1 | 3/2007 |
| WO | WO-2008-143086 A1 | 11/2008 |

OTHER PUBLICATIONS

Patent Abstracts of Japan JP2003-213179 A Published Jul. 30, 2003 and Machine English Translation.
Patent Abstracts of Japan JP2003-253167 A Published Oct. 9, 2003 and Machine English Translation.
Patent Abstracts of Japan JP2005-194500 A Published Jul. 21, 2005 and Machine English Translation.

* cited by examiner

*Primary Examiner* — Helene Klemanski
(74) *Attorney, Agent, or Firm* — Harness, Dickey & Pierce, P.L.C.

(57) ABSTRACT

An ink composition includes a slightly water-soluble alkanediol having 7 to 10 carbon atoms and cyclodextrin compound.

7 Claims, No Drawings

INK COMPOSITION

The entire disclosure of Japanese Application No.: 2010-217276 filed on Sep. 28, 2010 is expressly incorporated by reference herein.

BACKGROUND

1. Technical Field

The present invention relates to an ink composition capable of obtaining a high quality recording matter even on various recording media, particularly non- or low absorbable recording media such as synthetic paper or printing paper.

2. Related Art

An ink jet recording method is a printing method for printing by letting ink droplets fly and attach to a recording medium such as paper. According to recent innovative progress in ink jet recording technology, the ink jet recording method has been also used in the field of highly fine printing that was achieved by silver halide photography or offset printing before. With this, an ink for ink jet recording has been developed so that an image having glossiness similar to that achieved by silver halide photography can be formed by the ink jet recording on so-called exclusive paper, which is a recording medium having high gloss being equal to that of photographic paper or art paper used in the fields of silver halide photography and offset printing. In addition, ink for ink jet recording that can achieve an image quality, even on plain paper, similar to that achieved by silver halide photography has been developed.

Incidentally, desk top publishing (DTP) has been spreading in recent years, in particular, in the printing field, with technology for forming an image from digital data becoming widespread. Even when printing is carried out by DTP, a proof for color proofing is preliminarily prepared in order to confirm the glossiness and color impression of the actual printed matter. The ink jet recording system is applied to the output of the proof, and exclusive paper for ink jet recording is usually used as the recording medium since high color reproducibility and high color stability of the printed matter are required in DTP.

A proof sheet, which is exclusive paper for ink jet recording, is produced so as to exhibit glossiness and color impression similar to those of the actual output printed on printing paper. Thus, the material of the exclusive paper is properly adjusted depending on the type of printing paper. However, production of exclusive paper that can respond to all of the various types of printing paper causes an increase in manufacturing cost. Accordingly, in application to color proofing, it is desired, from the technical viewpoint, to conduct ink jet recording on printing paper rather than on exclusive paper. Furthermore, if it is possible to conduct ink jet recording directly on printing paper, not on exclusive paper, for providing a final proof sample, this can significantly decrease the cost for proof and therefore is desired from the economical viewpoint. In addition, synthetic paper prepared by mixing an inorganic filler and the like with a polyethylene resin, a polypropylene resin or a polyester resin and then forming the mixture into a film is widely used in the printing field. The synthetic paper is excellent in recyclability and thereby has recently received widespread attention as an environment-friendly material. It is desired to record on such synthetic paper, from the environmental viewpoint.

The printing paper is coated paper having a coating layer on the surface for receiving oil-based ink and has a characteristic that the coating layer is poor in ink-absorbing ability against aqueous ink. Therefore, in the use of aqueous pigment ink, which is usually used in ink jet recording, bleeding or beading unevenness may occur in an image because of low permeability of the ink into the recording medium (printing paper).

In view of the above-mentioned problems, for example, JP-A-2005-194500 discloses a pigment ink that is decreased in bleeding and also is excellent in gloss with exclusive paper by including a polysiloxane compound as a surfactant and an alkanediol, such as 1,2-hexanediol, as a solubilization aid. In addition, JP-A-2003-213179, JP-A-2003-253167, or JP-A-2006-249429 proposes that permeability of ink into a recording medium is controlled by adding a diol such as glycerin or 1,3-butanediol or a triol alcohol solvent such as pentanetriol to the ink for forming a high-quality image. However, an ink composition for forming a yet further high-quality image has been demanded up to now.

The inventors have recently found out the fact that when an ink composition contains a slightly water-soluble alkanediol having 7 to 10 carbon atoms and cyclodextrin compound, a high-quality image free from bleeding or beading can be formed even in a case of various recording media, in particular, a non- or low absorbable recording medium such as synthetic paper and printing paper, and is excellent in storage stability of ink. The invention is based on this finding.

SUMMARY

An advantage of some aspects of the present invention is to provide an ink composition where a high-quality image free from bleeding or beading can be formed even in a case of various recording media, in particular, a non- or low absorbable recording medium such as synthetic paper and printing paper and is excellent in storage stability of ink.

According to an aspect of the present invention, there is provided an ink composition containing a slightly water-soluble alkanediol having 7 to 10 carbon atoms, and cyclodextrin compound.

According to the ink composition of the aspect of the present invention, a high-quality image free from bleeding or beading can be formed even in a case of various recording media, in particular, a non- or low absorbable recording medium such as synthetic paper and printing paper and is excellent in storage stability of ink.

DESCRIPTION OF EXEMPLARY EMBODIMENTS

In the specification, the hydrocarbon moiety of alkanediol may be any of straight and branched chains.

Further, in the specification, "slightly water-soluble" means that the solubility in water at 20° C. (the amount of a solute in 100 g water) is less than 1.0 g. In the specification, "miscible" means that a solution is dispersed or dissolved homogeneously without aggregation or phase separation in terms of the solubility in water at 20° C. (when the amount of a solute in 100 g water is 10.0 g).

Further, in the specification, "non- or low absorbable recording medium" means a recording medium having no or insufficient aqueous ink-receptive layer. More quantitatively, a non- or low absorbable recording medium means that a recording plane is a recording medium where a water absorption amount to 30 $msec^{1/2}$ from the start of contact is equal to or less than 10 $mL/m^2$ in a Bristow method. The Bristow method is a method for measuring a liquid absorption amount for a short time, which has been widely used and is also used in JAPAN TAPPI. Details of the testing method is described in "Paper and plate paper-liquid absorption test method-Bristow method" of JAPAN TAPPI Paper Pulp Test Method (2000) No. 51.

Ink Composition

The ink composition of the invention contains slightly water-soluble alkanediols having 7 to 10 carbon atoms and cyclodextrin compound. An ink composition which contains a slightly water-soluble alkanediol having 7 to 10 carbon atoms and cyclodextrin compound can be used even for various recording media particularly non- or low absorbable recording media to achieve high precision and a high quality image.

In this specification, "beading" means density unevenness in similar colors that occurs locally when an image of one color is printed (for example, when a 6-inch square image of one color ("one color" means that the number of colors printed is one and two or more ink compositions may be used to realize that color) is printed), and does not mean that some of the recording medium surface remains uncoated with inks. "Bleeding of coloring materials" refers to mixing of colors near the border between images of different colors printed adjacent to each other (for example, 3-inch square images of different colors are printed next to each other). "Bleeding of solvents" refers to a phenomenon that occurs when images of different colors are printed adjacent to each other (for example, 3-inch square images of different colors are printed next to each other), where the coating state near the border changes due to migration of coloring materials caused by exudation of solvents, thereby generating density unevenness in similar colors.

In the invention, occurrence of curling, i.e., curing of a recording medium with its printed surface at the inner side, can be suppressed even when printing paper or the like having a weight of 73.3 to 209.2 g/m$^2$ and more preferably thin printing paper having a weight of 73.3 to 104.7 g/m$^2$ is used as the recording medium.

The reason why high-quality images free of bleeding or beading can be obtained by adding a slightly water-soluble alkanediol having 7 to 10 carbon atoms and cyclodextrin compound is not exactly clear but is presumably as follows.

It is thought that, beading of inks which occurs when recording is conducted on a recording medium is probably caused by ink droplets adhering on the recording medium which results in flow, in a case where ink has a surface tension higher than 24 mN/m. That is to say, it is thought that, beading is caused by an increased contact angle of ink droplets to the recording medium resulting in bouncing off of ink droplets. Therefore, a surface tension of ink should be reduced for beading suppression. However, when recording is conducted on a non- or low-absorbable recording medium, since water in an ink poses a difficulty in absorption, even an ink having a surface tension of 20 to 24 mN/m results in flow of ink droplets.

Further, a surface tension in the specification means a value determined using the Wilhelmy method. For example, a surface tension by the Wilhelmy method can be measured using an automatic surface tensiometer CBVP-Z (trade name, manufactured by Kyowa Interface Science Co., Ltd.).

Accordingly, in a non- or low absorbable recording medium, in order to suppress beading of inks, it is considered preferable to reduce the surface tension of the inks, as well as to suppress ink flowability after landing ink droplets onto a recording medium.

It is known that when ink is landed onto a recording medium, ink is spread and wet into the recording medium, which ink is permeated into. Bleeding of inks which occurs when recording is conducted on a recording medium is probably caused by ink droplets adhering on the recording medium which results in flow, in a case where ink has a surface tension higher than 24 mN/m. That is to say, it is thought that, bleeding is caused since wettability of ink to the recording medium is reduced, and solvent in an ink does not infiltrate directly. Therefore, a surface tension of ink should be reduced for bleeding suppression. However, when recording is conducted on a non- or low-absorbable recording medium, since water in an ink poses a difficulty in permeation, even an ink having a surface tension of 20 to 24 mN/m results in flow of ink droplets.

Accordingly, in a non- or low absorbable recording medium, in order to suppress bleeding of inks, it is considered preferable to reduce the surface tension of the inks, as well as to suppress ink flowability after landing ink droplets onto a recording medium.

For the ink composition of the invention, an ink having a low surface tension and a low flowability of ink droplets after landing onto a recording medium is realized. As a result, bleeding and beading are effectively suppressed.

Slightly Water-Soluble Alkanediol

The ink composition of the invention contains a slightly water-soluble alkanediol having 7 to 10 carbon atoms (hereinafter, referred to as "slightly water-soluble alkanediol").

According to a preferable embodiment of the invention, the slightly water-soluble alkanediol having 7 to 10 carbon atoms is an alkanediol at one end. According to a preferable embodiment of the invention, the slightly water-soluble alkanediol preferably having 7 to 10 carbon atoms is a slightly water-soluble 1,2-alkanediol and therefore beading can be more effectively suppressed. Examples of the slightly water-soluble 1,2-alkanediol include 1,2-heptanediol, 1,2-octanediol, 5-methyl-1,2-hexanediol, 4-methyl-1,2-hexanediol, or 4,4-dimethyl-1,2-pentanediol. Among these, 1,2-octanediol is more preferable.

According to the preferable embodiment of the invention, the content of slightly water-soluble alkanediol having 7 to 10 carbon atoms is suitably determined to achieve a high quality image so long as it efficiently suppress bleeding and beading of inks but is preferably 1.0 to 4.0% by mass, more preferably 1.5 to 3.0% by mass relative to the entire composition. When the amount of the slightly water-soluble alkanediol having 7 to 10 carbon atoms is within the aforementioned ranges, in particular, not below the lower limits, bleeding and beading of ink can be suppressed to achieve high quality images. Further, When the amount of the slightly water-soluble alkanediol having 7 to 10 carbon atoms is within the aforementioned ranges, in particular, not beyond the upper limits, the initial viscosity of the inks does not increase excessively and separation of the oil layer can be effectively prevented in a general ink storage state, which is preferable from the viewpoint of ink storage property.

According to the preferable embodiment of the invention, a slightly water-soluble alkanediol is 1,2-octanediol, and the content of slightly water-soluble alkanediol is an ink composition which contains 1.5 to 3.0% by mass relative the ink composition. The amount of the slightly water-soluble alkanediol is not below the lower limits, and therefore bleeding and beading of ink can be suppressed. Further, when the amount is not beyond the upper limits, the initial viscosity of the inks does not increase excessively.

Cyclodextrin Compound

The ink composition of the invention contains cyclodextrin compound. The cyclodextrin compound of the invention are cyclic oligosaccharides, preferably one kind of inclusion compound. Cyclodextrin compound form a basic skeleton formed by bonding a glucose molecule with an α-1,4 glucoside bond, and are called α-cyclodextrin (six), β-cyclodextrin (seven), γ-cyclodextrin (eight), δ-cyclodextrin (nine) according to the number of glucose molecules, wherein the number of glucose molecules is described in parentheses.

The cyclodextrin compound have a specific structure in which the cyclic structure shows a hydrophilicity in the outer portion thereof and a hydrophobicity (lipophilicity) in the inner portion thereof. The cyclodextrin compound which are derived from this specific structure are incorporated so as to envelope lipophilic molecules smaller than an inner diameter of the cyclic structure, resulting in complexion in many cases. Further, if the cyclodextrin compound have a smaller portion than an inner diameter of the cyclic structure, when they have a larger molecule than an inner diameter of the cyclic structure, the portion is incorporated in an inner portion of the cyclodextrin compound, resulting in complexation in many cases. For example, an inner diameter of the cyclodextrin is 4.7 to 5.3 Å for α-cyclodextrin, 6.0 to 6.5 Å for β-cyclodextrin, 7.5 to 8.3 Å for γ-cyclodextrin.

The cyclodextrin compound used in the invention are not particularly limited, but include one or more kinds selected from the group consisting of α-cyclodextrin, β-cyclodextrin, γ-cyclodextrin, and δ-cyclodextrin, and a cyclodextrin having one or more substituents is preferable. Examples of the substituent which cyclodextrin compound have include an acyl group, a hydroxylalkyl group, an alkyl group, a glucosyl group, an amino group and a carboxymethyl group. Further, examples thereof include a cyclodextrin polymer which is crosslinked by a crosslinking agent such as epichlorohydrin or a multivalent glycidyl ether; a branched cyclodextrin, a highly-branched cyclodextrin having branched side chains such as, glucose and maltose.

One or more kinds of the aforementioned cyclodextrin compound can be used. As preferable substituents, an alkyl group is preferable; a methyl group is more preferable. From the viewpoint of high solubility in water at 25° C. of 30% by mass or more and high miscibility with a slightly water-soluble alkanediol, methyl-β-cyclodextrin is more preferable.

Methods of preparing cyclodextrin compound are not particularly limited, but are suitably selected from the viewpoint of ease of preparation, cost, and structure of resultant cyclodextrin compound. Methods of preparing cyclodextrin compound having no substituent which can be used include action of Bacillus macerans-derived enzyme to starch. Methods of preparing cyclodextrin compound having a substituent which can be used include a method of reacting cyclodextrin compound of which a portion of hydroxyl groups are subject to deprotonation, or derivatives thereof as a reaction intermediate. Commercially available cyclodextrin compound may be used, and for example include CAVASOL and CAVAWAX (manufactured by Wacker Corporation).

According to preferable embodiments of the invention, cyclodextrin compound may be suitably determined so long as it has the effect, but it preferably contains 6.0 to 18.0% by mass, more preferably 8.0 to 14.0% by mass relative to whole ink composition. When the amount of cyclodextrin compound is within the aforementioned ranges, in particular, not below the lower limits, it is preferable from the viewpoint of fixability to film. When the amount of cyclodextrin compound is within the aforementioned ranges, in particular, not beyond the upper limits, the viscosity of the inks does not increase excessively. Further, it is preferable because precipitation of cyclodextrin compound in a low temperature environment can be suppressed. More preferably, a cyclodextrin is a methylated β-cyclodextrin and contains 6.0 to 18.0% by mass relative to the ink composition.

Further, according to preferable embodiments of the invention, a ratio of the slightly water-soluble alkanediol content to the cyclodextrin compound content is preferably 1:2 to 1:12, and more preferably 1:4 to 1:8. By using the above-described range, the slightly water-soluble solvent can be mixed (dispersed or dissolved homogeneously without aggregation or phase separation), which is preferable from the viewpoint of ink stability.

Solid Wetting Agent

The ink composition of the invention may preferably contain a solid wetting agent (hereinafter, referred to as "solid wetting agent") which is a solid even when left to stand in an environment at 20° C. and 60% relative humidity, that is to say, at 20° C. and 60% relative humidity. The solid wetting agent contains a first saccharide, a second saccharide, and trimethylolalkanes. Further, the solid wetting agent preferably contains one or more kinds selected from the group consisting of a first saccharide, a second saccharide, and trimethylolalkanes. The first saccharide, second saccharide, and trimethylolalkanes will be described below.

First Saccharide

The first saccharide which can be preferably used is sugar. It is preferable that the first saccharide is a solid even when left to stand in an environment at 20° C./60% RH for 24 hours. Further, a hygroscopicity to 20° C./80% RH from 20° C./60% RH is preferably equal to or more than 0% by mass and less than 10% by mass. Further, the first saccharide preferably has a solubility in 100 g of water at 20° C. of 30% by mass or more.

In the specification, for example "RH hygroscopicity to B° C./Y % from A° C./X % RH" is a value represented by the following formula. (hygroscopicity (% by mass))=100× $(M_{B-Y} - M_{A-X})/M_{A-X}$ $M_{A-X}$ represents a mass after being left to stand for 24 hours in an environment at A° C. and a relative humidity X %.

$M_{B-Y}$ represents a mass after being left to stand for 24 hours in an environment at B° C. and a relative humidity Y %.

The first saccharide is not particularly limited so long as it has an effect of the invention, and one or more kinds selected from the group consisting of trehalose, isotrehalose, neotrehalose, and mannitol are preferable. Further, it may be at least a trisaccharide which contains a saccharide selected from the group consisting of trehalose, isotrehalose, and neotrehalose, and for example includes maltosyl trehalose formed of trehalose and maltose.

Trehalose is a nonreducing disaccharide containing a glucoside bond between the 1-positions of glucose units. Since trehalose is a nonreducing sugar, browning caused by the Maillard reaction does not occur and trehalose is preferable from the viewpoint of storage stability of the ink. Moreover, trehalose has a high water solubility and a water retention ability and extremely low hygroscopicity. Specifically, highly pure trehalose anhydride has a remarkably high solubility in water (69 g/100 g(20° C.)), but has no hygroscopicity in a humidity of 95% or lower. Accordingly, when trehalose is in contact with water, it absorbs water to form a gel, but it has no hygroscopicity in an environment at 20° C. and humidity of about 45%, and therefore it can be stably present.

Further, isotrehalose and neotrehalose are nonreducing disaccharides containing glucoside bonds. Since they are nonreducing sugars, browning caused by the Maillard reaction does not occur and they are preferable from the viewpoint of storage stability of the ink.

Examples of commercially available first saccharide include TREHA fine powder (manufactured by Hayashibara Shoji Inc.) as commercially available trehalose and D-mannitol (manufactured by Oji Chemical Industry Ltd.), and the like as commercially available mannitol.

Further, the first saccharide can be prepared from starch sugar by specific methods such as fermentation, hydrolysis, transglycosyl reaction, glycosyl condensation reaction, reaction with epimerase (isomerization), polymerization, and chemical crosslinking. Solidification can be performed by specific method, that is to say, a method where Maskit which is solution containing saccharides is sprayed and dried, a method where moisture of Maskit is naturally dried to crystallize and solidify in a block shape, followed by grinding, and a method where recrystallization is performed using a seed crystal from Maskit in a dissolved condition. Further, Maskit may be present so long as a first saccharide can be obtained as a saccharide for obtaining the aforementioned low hygroscopicity, and the saccharides may be contained in two or more kinds.

When an ink composition containing these first saccharides is used, in particular is used in printing at high speed, beading caused by flow unevenness can be suppressed. The reason is not clear, but it is thought to be as follows. The first saccharide in the ink composition attached on a recording medium has a high solubility in water and a high water retention ability, and water in the ink composition after attachment can be incorporated and gelated (or solidified). It is thought that an ink droplet which is subject to gelation (or solidification) suppresses flowability (flow unevenness). Further, it is thought that the ink composition contains a lot of water soluble sugar according to van't Hoff's law, so that a permeation pressure and rate are increased. Irrespective of the aforementioned concept, beading is suppressed so that printing at high speed can be performed. Further, a color reproducible region of a printing matter is increased because of an increase of a duty limiting value of ink attached on the recording medium.

Further, a recording matter obtained using an ink composition containing these first saccharides can improve resistance to dew formation in a high humidity environment at 20° C. and 60% humidity.

Further, an ink composition containing these first saccharides can improve clogging recoverability in an environment in which a head is capped. The reason is not clear, but since the ink composition has low hygroscopicity, the ink composition in a cap does not remove moisture from the ink composition filled in a head, and therefore provides an excellent clogging recoverability in a cap-closed state.

An ink composition containing these first saccharides prevents growth of ice crystals, and therefore storage stability of ink at low temperature is improved.

According to preferable embodiments of the invention, the first saccharide may be suitably determined so long as it has this effect, but it preferably contains 3.0 to 9.0% by mass relative to the whole ink composition. When the amount of crystalline saccharide is in within the aforementioned ranges, in particular, not below the lower limits, it is preferable because clogging recoverability is improved in the environment described above, and it is preferable from the viewpoint of gloss. Further, when the amount of the first saccharide is in within the aforementioned ranges, in particular, not beyond the upper limits, the initial viscosity of the inks does not increase excessively and a freezing temperature is reduced, and therefore it is preferable from the viewpoint of storage stability of ink at low temperature. Occurrence of curling, i.e., curling of a recording medium with its printed surface at the inner side, can be suppressed even when thin printing paper or PPC paper (plain paper) having a weight of 73.3 g/m² or less is used. The reason is not clear, but it is thought to be as follows. Cellulose is a long chain saccharide connecting (polymerizing) monosaccharides. Curling occurs by stopping hydrogen bonding between cellulose molecules due to water molecules and by generating hydrogen bonding between cellulose molecules in a different portion from the hydrogen bonding portion between cellulose molecules when water is evaporated and dried. Accordingly, in order to suppress curl, after water is evaporated and dried, a hydrogen bond between cellulose molecules may be inhibited as quickly as possible. It is thought that effective materials as these inhibitors are a crystalline saccharide having a molecular structure similar to cellulose, and more preferably trehalose, isotrehalose, and neotrehalose having excellent drying and recystalline properties.

Second Saccharide

It is preferable that the second saccharide which can be preferably used in the invention is a sugar and a solid after being left to stand in an environment at 20° C./60% RH for 24 hours. Further, a hygroscopicity to 20° C./80% RH from 20° C./60% RH is preferably equal to or more than 10% by mass and equal to or less than 30% by mass. Further, it is preferable that the Second saccharide has a solubility in 100 g of water at 20° C. of 30% by mass or more.

The second saccharide is not particularly limited so long as it has an effect of the invention. Examples of straight maltooligosaccharides having only an α-1,4 bond include maltose, maltotriose, maltotetraose, maltopentaose, maltohexaose, maltoheptaose, maltooctaose, maltononaose, maltodecaose, or the like. Examples of the branched maltooligosaccharide having an α-1,6 bond in a molecule obtained from the branched moiety of amylopectin include, isomaltose, panose (glucosyl maltose), glucosyl maltotriose, or the like, further, maltitol, sorbitol, xylitol, erythritol and sucrose. Among them, one or more kinds selected from the group consisting of maltotriose, maltotetraose and maltopentaose have an excellent moisture absorbency, and therefore they are preferable. Further, they may include reducing sugars of these.

Examples of commercially available second saccharides include OLIGOTOSE (manufactured by SANWA CORNSTARCH CO., LTD) as a commercially available maltotriose, SUNMALT (manufactured by Hayashibara Shoji Inc.) as a commercially available maltose, MABIT (manufactured by Hayashibara Shoji Inc.) or liquid crystal MABIT (manufactured by Hayashibara Shoji Inc.) as a commercially available maltitol. Commercially available crystalline erythritol includes available products manufactured by Nikken Chemical Co., Ltd., Mitsubishi Kagaku Foods Corporation, Celesta Corporation, and Cargil Corporation.

Further, the second saccharide can be prepared according to a specific method in the same manner as the aforementioned first saccharide.

Further, an ink composition containing these second saccharides can improve clogging recoverability in a low humidity environment. The reason is not clear, but since the ink composition has high hygroscopicity, it is thought that moisture in the atmosphere even in low humidity environment is incorporated to have excellent clogging recoverability. Accordingly, for example, recording can be conducted stably over a long period of time without capping of a head.

According to preferable embodiments of the invention, the second saccharide may be suitably determined so long as it has the effect, but it preferably contains 3.0 to 9.0% by mass relative to the whole ink composition. When an amount of high hygroscopicity second saccharide is within this range, in particular, not below the lower limits, it is preferable because clogging recoverability is improved in a high temperature and high humidity open environment and it is preferable from the viewpoint of gloss. When the amount of the second saccharide is within the aforementioned ranges, in particular, not beyond the upper limits, Tg of an ink film is not increased excessively to provide flexibility, and therefore it is preferable from the viewpoint of ink flexibility. Further, the first saccharide having excellent drying and recystalline properties can be suppressed from depositing in a waste solution portion of a printer, which is preferable.

Trimethylolalkanes

It is preferable that the trimethylolalkanes which can be used in the invention are solids after being left to stand in an environment at 20° C./60% RH for 24 hours. Further, a hygroscopicity to 20° C./80% RH from 20° C./60% RH is preferably equal to or more than 10% by mass and equal to or less than 30% by mass. Further, the trimethylolalkanes have a solubility in 100 g of water at 20° C. of 30% by mass or more.

The trimethylolalkanes are not particularly limited so long as they have an effect of the invention, and for example include trimethylolethane, trimethylolpropane, trimethylolhexane, trimethyloloctane, trimethylolheptadecane, and the like. In particular, trimethylolethane, and trimethylolpropane are preferable from the viewpoint of water solubility.

Further, the ink composition containing the trimethylolalkanes can improve clogging recoverability in a low temperature environment in the same manner as the second saccharide. The reason is not clear, but since the ink composition has a high hygroscopicity, it is thought that moisture in the atmosphere even in low humidity environment is incorporated to have excellent clogging recoverability. Accordingly, for example, recording can be conducted stably over a long period of time without capping of a head.

Examples of the commercially available trimethylolalkanes include trimethylolethane, trimethylolpropane, or the like manufactured by Mitsubishi Gas Chemical Co., Inc.

According to preferable embodiments of the invention, the trimethylolalkanes may be suitably determined so long as they have this effect, but 3.0 to 9.0% by mass relative to the whole ink composition is preferably contained. When an amount of high hygroscopicity trimethylolalkanes is within the range, in particular, not below the lower limits, it is preferable because clogging recoverability is improved in a high temperature and high humidity open environment and it is preferable from the viewpoint of gloss. When the amount of the trimethylolalkanes is within the aforementioned ranges, in particular, not beyond the upper limits, the first saccharide having excellent drying and recystalline properties can be suppressed from depositing in a waste solution portion of a printer, which is preferable.

According to preferable embodiments of the invention, the solid wetting agent contains 4.5 to 13.5% by mass relative to the ink composition.

Further, according to other preferable embodiments of the invention, the sum total content of the first and second saccharides is preferably 6.0% to 18.0% by mass relative to the total amount of ink composition. By using this range, clogging recoverability can be improved. Further, the ratio of the first saccharide content to the second saccharide content is not particularly limited, but it is preferably 1:5 to 5:1. By using this range, increase of clogging recoverability in a closed system and flowability of ink waste solution can be ensured.

According to preferable embodiments of the invention, the solid wetting agent preferably contains trimethylolpropane and maltotriose as a second saccharide. A solid wetting agent in an ink composition contains trimethylolpropane and maltotriose to achieve excellent clogging recoverability in an open system. According to a further preferable embodiment, the solid wetting agent contains trimethylolpropane, trehalose as a first saccharide and maltotriose as a second saccharide. The solid wetting agent in an ink composition includes methylolpropane, trehalose, and maltotriose, and therefore can obtain an ink composition with excellent clogging recoverability in a closed system.

According to preferable embodiments of the invention, the solid wetting agent contains one or more kinds selected from the group consisting of first saccharide, second saccharide, and trimethylolalkanes. The first saccharide is one or more kinds selected from the group consisting of trehalose, isotrehalose, neotrehalose, and mannitol. The second saccharide is one or more kinds selected from the group consisting of maltotriose, maltotetraose, and maltopentaose. The trimethylolalkanes are preferably trimethylolethane and/or trimethylolpropane. A solid wetting agent in an ink composition contains these first saccharides, second saccharides, and trimethylolalkanes to achieve excellent clogging recoverability in an open system.

According to a further preferable embodiment of the invention, the solid wetting agent is preferably two or more kinds selected from the group consisting of trimethylolpropane, trehalose, and maltotriose. A solid wetting agent in an ink composition contains two or more kinds selected from the group consisting of trimethylolpropane, trehalose, and maltotriose, to have excellent clogging recoverability in a closed system in addition to an open system.

According to a further preferable embodiment of the invention, a ratio of the slightly water-soluble alkanediol content to the solid wetting agent content is not particularly limited, but is preferably 1:3 to 1:9, and further preferably 1:4 to 1:8. By using this content ratio, clogging recoverability in open and closed systems is ensured, while beading and bleeding can be increased.

Colorant

The ink composition of the invention may contain colorants. Examples of the colorants include dyes or pigments but are preferably pigments from the viewpoints of lightfastness and water resistance. The colorants preferably contain pigments and the following dispersants that can disperse the pigments in the ink.

Examples of the pigments include inorganic pigments and organic pigments which can be used independently or in combination of two or more kinds. Examples of the inorganic pigments include titanium oxide, iron oxide, and carbon black produced by a known method such as a contact method, a furnace method, or a thermal method. Examples of the organic pigments that can be used include azo pigments (azo lakes, insoluble azo pigments, condensed azo pigments, chelate azo pigments, or the like), polycyclic pigments (for example, phthalocyanine pigments, perylene pigments, perinone pigments, anthraquinone pigments, quinacridone pigments, dioxazine pigments, thioindigo pigments, isoindolinone pigments, quinophthalone pigments, or the like), dye chelates (for example, basic dye chelates, acidic dye chelates, or the like), nitro pigments, nitroso pigments, and aniline black.

Specific examples of the pigments can be provided according to the type (color) of the ink composition to be obtained. Examples of the pigments for a yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. They may be used independently or in combination of two or more kinds. Among these, at least one selected from the group consisting of C.I. Pigment Yellow 74, 110, 128, and 129 is preferably used. Examples of the pigments for a magenta ink composition include C.I. Pigment Red 5, 7, 12, 48(Ca), 48(Mn), 57(Ca), 57:1, 112, 122, 123, 168, 184, 202, 209; and C.I. Pigment Violet 19. They may be used independently or in combination of two or more kinds. Among these, at least one selected from the group consisting of C.I. Pigment Red 122, 202, and 209 and C.I. Pigment Violet 19 is preferably used. They may be a solid solution. Examples of the pigments for a cyan ink composition include C.I. Pigment Blue 1, 2, 3, 15:2, 15:3, 15:4, 15:34, 16, 22, and 60; and C.I. Vat Blue 4 and 60. They may be used independently or in combination of two or more kinds. Among these, C.I. Pigment Blue 15:3 and/or 15:4 is preferably used, and C.I. Pigment Blue 15:3 is particularly preferably used.

Examples of the pigment for a black ink composition include inorganic pigments including carbons such as lampblack (C.I. Pigment Black 6), acetylene black, furnace black (C.I. Pigment Black 7), channel black (C.I. Pigment Black 7), carbon black (C.I. Pigment Black 7) and the like and iron oxide pigments; and organic pigments such as aniline black (C.I. Pigment Black 1). In a preferred embodiment, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (products of Mitsubishi Chemical Corporation up to here), SpecialBlack 4A and 550, Printex 95, 90, 85, 80, 75, 45, and 40 (products of Degussa Corporation up to here), Regal 660, RmogulL, monarch 1400, 1300, 1100, 800, and 900 (products of Cabot Corporation up to here), Raven 7000, 5750, 5250, 3500, 3500, 2500 ULTRA, 2000, 1500, 1255, 1200, 1190 ULTRA, 1170, 1100 ULTRA, and Raven 5000 UIII (products of Columbian Chemicals Company up to here).

The concentration of the pigment is not particularly limited so long as the pigment concentration (content) can be adequately adjusted while preparing the ink composition. The solid concentration of the pigment is preferably 7% by mass or more and more preferably 10% by mass or more. When ink droplets land on a recording medium, the ink spreads on the surface of the recording medium while it is still wet. However, when the pigment solid concentration is 7% by mass or more, the flowability of the ink after the wet-spreading of the ink stops is lost rapidly and bleeding on a recording medium such as printing paper can be further suppressed even when printed at a low resolution. That is to say, when the slightly water-soluble alkanediol, and the solid wetting agent are used in combination, the ink in a wet state spreads even on a recording medium having a low ink absorbency, and the solid wetting agent speeds up the drying since it increases the solid content without excessively increasing the initial viscosity. Moreover, since use of the pigment increases the solid concentration in the ink, the flowability of the ink on the recording medium is decreased, and the bleeding can be suppressed. In particular, the effects of suppressing beading and bleeding are particularly strong when the recording time intervals between the landing of a first ink droplet and the landing of an adjacent or overlapping second ink droplet are in the range of about 0.1 seconds to less than 2 seconds. "Recording time intervals" refers to the time intervals between application of an ink on a recording medium and application of another ink adjacent to or overlapping the earlier ink or time intervals between two continuous recordings in the case where recording is conducted when an image is recorded by being divided up according to the number of recording pixels.

The pigments described above are preferably pigments kneaded with dispersants described below from the viewpoints of simultaneously achieving gloss of a color image, prevention of bronzing, and storage stability of the ink composition and at the same time enabling formation of a color image being yet more superior in terms of gloss.

Dispersant

The ink composition according to the present invention preferably comprises at least one resin selected from a group consisting of styrene-acrylic acid copolymer resins, oxyethyl acrylate resins, urethane resins, and fluorene resins, as a dispersing agent for dispersing a colorant; more preferably at least one resin selected from a group of consisting of oxyethyl acrylate resins and fluorene resins.

These copolymer resins are adsorbed on a pigment to improve the dispersibility.

Specific examples of the hydrophobic monomer in the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethyl hexyl acrylate, 2-ethyl hexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethyl aminoethyl acrylate, 2-dimethyl aminoethyl methacrylate, 2-diethyl aminoethyl acrylate, 2-diethyl aminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonyl phenyl acrylate, nonyl phenyl methacrylate, benzyl acrylate, benzyl methacrylate, dicyclopentenyl acrylate, dicyclopentenyl methacrylate, formyl acrylate, formyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methyl styrene, vinyl toluene, and hydroxyethylated orthophenyl phenol acrylate. They may be used independently or in combination of two or more kinds.

Specific examples of hydrophilic monomers include acrylic acid, methacrylic acid, maleic acid, itaconic acid, and the like.

From the viewpoints of simultaneously achieving gloss of a color image, prevention of bronzing, and storage stability of the ink composition and at the same time enabling formation of a color image being yet more superior in terms of gloss, the copolymer resin of the hydrophobic and hydrophilic monomers preferably includes any of styrene-(meth)acrylic acid copolymerization resin, styrene-methyl styrene-(meth)acrylic acid copolymerization resin, or styrene-maleic acid copolymerization resin, (meth)acrylic acid-(meth)acrylic ester copolymerization resin, or styrene-(meth)acrylic acid-(meth)acrylic ester copolymerization resin, and hydroxyethylated orthophenyl phenol acrylic ester-(meth)acrylic acid copolymerization resin.

The copolymer resin may be a resin (styrene-acrylic acid resin) containing a polymer produced by reacting styrene with acrylic acid or an acrylic ester. Alternatively, the copolymer resin may be an acrylic acid-type water-soluble resin. Alternatively, salts thereof, for example, sodium, potassium, ammonium, triethanolamine, triisopropanolamine, triethylamine, or diethanolamine salts thereof, may also be used.

The acid value of the copolymer resin is preferably 50 to 320, more preferably 100 to 250, from the viewpoints of simultaneously achieving gloss of a color image, prevention of bronzing, and storage stability of the ink composition and at the same time enabling formation of a color image being more superior in terms of gloss.

The weight average molecular weight (Mw) of the copolymerization resin is preferably 2,000 to 30,000, more preferably 2,000 to 20,000, from the viewpoints of simultaneously achieving gloss of a color image, prevention of bronzing, and storage stability of the ink composition and at the same time enabling formation of a color image being more superior in terms of gloss.

The glass transition temperature (Tg; as measured according to JIS K 6900) of the copolymer resin is preferably 30° C. or above, more preferably 50 to 130° C., from the viewpoints of simultaneously achieving gloss of a color image, prevention of bronzing, and storage stability of the ink composition and at the same time enabling formation of a color image being more superior in terms of gloss.

The copolymer resin is adsorbed on the pigment or is free in a pigment dispersion and preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the copolymer resin is preferably 20 to 50 parts by weight, more preferably 20 to 40 parts by weight, based on 100 parts by weight of the pigment, from the viewpoints of simultaneously achieving gloss of a color image, prevention of bronzing, and storage stability of the ink composition and at the same time enabling formation of a color image being more superior in terms of gloss.

In the invention, oxyethyl acrylate-based resins can be used as the copolymerization resins. The use of such a resin provides a reduction in the initial viscosity of ink, excellent storage stability at high temperature, and an excellent property of recovering from clogging and therefore is further preferred.

The above-mentioned oxyethyl acrylate-based resin is not particularly limited, but is preferably a compound represented by the following Formula (I) as long as it has an oxyethyl acrylate skeleton. The compound represented by the following Formula (I) is, for example, a resin containing, in terms of the monomer mole ratio, 45 to 55% of ortho-hydroxyethylated phenylphenol acrylate having CAS No. 72009-86-0, 20 to 30% of acrylic acid having CAS No. 79-10-7, and 20 to 30% of methacrylic acid having CAS No. 79-41-4. These may be used independently or in combination of two or more kinds. Furthermore, the monomer composition ratio is not particularly limited, but is preferably 70 to 85% of the ortho-hydroxyethylated phenylphenol acrylate having CAS No. 72009-86-0, 5 to 15% of acrylic acid having CAS No. 79-10-7, and 10 to 20% of methacrylic acid having CAS No. 79-41-4.

[Chem. 1]

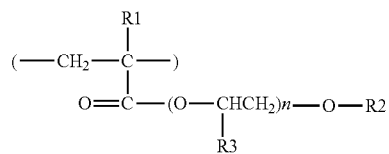

(R1 and/or R3 are a hydrogen atom or a methyl group, R2 is an alkyl group or an aryl group, and n is an integer of 1 or more.)

Preferred examples of the compound represented by Formula (I) above include nonylphenoxypolyethylene glycol acrylate and polypropylene glycol #700 acrylate.

The content of the oxyethyl acrylate-based resin is preferably 10 to 40 parts by mass and further preferably 15 to 25 parts by mass based on 100 parts by mass of the pigment, from the viewpoints of simultaneously lowering the initial viscosity of an ink composition and achieving storage stability of the ink composition and at the same time preventing the formation of uneven aggregation and enabling formation of a color image excellent in the burying property.

In the above-mentioned oxyethyl acrylate-based resin, the total composition ratio of the resins derived from monomers having hydroxyl groups selected from the group consisting of acrylic acids and methacrylic acids is preferably 30 to 70% and further preferably 40 to 60%, from the viewpoints of simultaneously lowering the initial viscosity of an ink composition and achieving storage stability of the ink composition and at the same time achieving the property of recovering from clogging.

The number average molecular weight (Mn) of the oxyethyl acrylate-based resin before cross-linking is preferably 4000 to 9000 and more preferably 5000 to 8000, from the viewpoints of simultaneously lowering the initial viscosity of an ink composition and achieving storage stability of the ink composition. The Mn is measured by, for example, GPC (gel permeation chromatography).

The oxyethyl acrylate-based resin is adsorbed on the pigment or is free in a pigment dispersion, and the copolymer resin preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the oxyethyl acrylate-based resin is preferably 20 to 50 parts by mass and further preferably 20 to 40 parts by mass based on 100 parts by mass of the pigment, from the viewpoints of simultaneously achieving gloss of a color image, prevention of bronzing, and storage stability of the ink composition and at the same time enabling formation of a color image being more superior in terms of gloss.

Furthermore, in the invention, by using a urethane-based resin as a fixative pigment dispersant, gloss of a color image, prevention of bronzing, and storage stability of the ink composition are simultaneously achieved, and at the same time the color image can be formed so as to be further excellent in gloss. The urethane-based resin is a resin containing a polymer obtained by a reaction of a diisocyanate compound and a diol compound and, in the invention, is preferably a resin having a urethane bond and/or an amide bond and an acid group.

Examples of the diisocyanate compound include aromatic diisocyanate compounds such as hexamethylene diisocyanate and 2,2,4-trimethyl hexamethylene diisocyanate, aromatic diisocyanate compounds such as toluylene diisocyanate and phenylmethane diisocyanate, and modified derivatives thereof.

Examples of the diol compound include polyethers such as polyethylene glycol and polypropylene glycol, polyesters such as polyethylene adipate and polybutylene adipate, and polycarbonates.

The acid value of the urethane resin is preferably 10 to 300, more preferably 20 to 100, from the viewpoints of simultaneously achieving gloss of a color image, prevention of bronzing, and storage stability of the ink composition and at the same time enabling formation of a color image being more superior in terms of gloss. The acid value is the amount (mg) of KOH necessary for neutralizing 1 g of resin.

The weight average molecular weight (Mw) of the urethane resin before crosslinking is preferably 100 to 200,000, more preferably 1,000 to 50,000, from the viewpoints of simultaneously achieving gloss of a color image, prevention of bronzing, and storage stability of the ink composition and at the same time enabling formation of a color image being more superior in terms of gloss. The weight average molecular weight (Mw) is measured by gel permeation chromatography (GPC).

The glass transition temperature (Tg: measured in accordance with JIS K6900) of the urethane resin is preferably −50 to 200° C., and further preferably −50 to 100° C., from the viewpoints of simultaneously achieving gloss of a color image, prevention of bronzing, and storage stability of the ink composition and at the same time enabling formation of a color image being more superior in terms of gloss.

The urethane-based resin preferably has a carboxyl group.

The content of the urethane-based rein is preferably 20 to 50 parts by mass and further preferably 20 to 40 parts by mass based on 100 parts by mass of the pigment from the viewpoints of simultaneously achieving gloss of a color image, prevention of bronzing, and storage stability of the ink composition and at the same time enabling formation of a color image being more superior in terms of gloss.

Furthermore, in the invention, a fluorene-based resin can be used as a fixative pigment dispersant. The use of the resin provides a reduction in the initial viscosity of ink, storage stability at high temperature, and an excellent fixing property to printing paper, and therefore it is preferable.

In addition, the fluorene-based resin is not restricted, as long as the resin has a fluorene skeleton, and can be obtained by, for example, copolymerizing the following monomer units:

cyclohexane, 5-isocyanate-1-(isocyanate methyl)-1,3,3-trimethyl (CAS No. 4098-71-9);
ethanol, 2,2'-[9H-fluoren-9-ylidenebis(4,1-phenyleneoxy)] bis (CAS No. 117344-32-8);
propionic acid, 3-hydroxy-2-(hydroxymethyl)-2-methyl (CAS No. 4767-03-7); or
ethanamine, N,N-diethyl- (CAS No. 121-44-8).

As the fluorene-based resin, the monomer composition ratio is not particularly limited so long as it has a fluorine skeleton, but is preferably 35 to 45% by mass of 5-isocyanato-1-(isocyanatomethyl)-1,3,3-trimethylcyclohexane (CAS No. 4098-71-9), 40 to 60% by mass of 2,2'-[9H-fluoren-9-ylidenebis(4,1-phenyleneoxy)]bis-ethanol (CAS No. 117344-32-8), 5 to 15% by mass of 3-hydroxy-2-(hydroxymethyl)-2-methyl propionic acid (CAS No. 4767-03-7), and 5 to 15% of N,N-diethyl-ethanamine (CAS No. 121-44-8).

The number average molecular weight (Mn) of the fluorene-based resin before cross-linking is preferably 2000 to 5000 and more preferably 3000 to 4000 from the viewpoints of simultaneously achieving the initial viscosity of the ink composition and the storage stability of the ink composition. The Mn is measured by, for example, Gel Permeation Chromatography (GPC).

The fluorene-based resin is adsorbed on the pigment or is free in a pigment dispersion, and the copolymer resin preferably has a maximum particle diameter of 0.3 µm or less and more preferably has an average particle diameter of 0.2 µm or less (further preferably 0.1 µm or less), from the viewpoints of simultaneously achieving gloss of a color image, prevention of bronzing, and storage stability of the ink composition and at the same time enabling formation of a color image being more superior in terms of gloss. Here, the average particle diameter is the average value of dispersion diameters of particles actually formed by the pigment in a dispersion (50% cumulative diameter) and can be measured with, for example, a Microtrac UPA (Microtrac Inc.).

The content of the fluorene-based resin is preferably 20 to 50 parts by mass and further preferably 20 to 40 parts by mass based on 100 parts by weight of the pigment from the viewpoints of simultaneously achieving a color image-fixing property, prevention of bronzing, and storage stability of the ink composition and at the same time enabling formation of a color image being more superior in terms of gloss.

The mass ratio of the copolymer resin and the fixative pigment dispersant (the former/the latter) is preferably 1/2 to 2/1 and is further preferably 1/1.5 to 1.5/1 from the viewpoints of simultaneously achieving gloss of a color image, prevention of bronzing, and storage stability of the ink composition and at the same time enabling formation of a color image being more superior in terms of gloss.

The mass ratio of the solid content of the pigment and the total solid content of the copolymer resin and the fixative pigment dispersant (the former/the latter) is preferably 100/40 to 100/100 from the viewpoints of simultaneously achieving gloss of a color image, prevention of bronzing, and storage stability of the ink composition and at the same time enabling formation of a color image being more superior in terms of gloss.

Furthermore, a surfactant may be used as the dispersant. Examples of the surfactant include anionic surfactants such as fatty acid salts, higher alkyl dicarboxylates, higher alcohol sulfates, higher alkyl sulfonates, condensation products of higher fatty acids and amino acids, sulfosuccinates, naphthenates, liquid fatty oil sulfates, and alkylallyl sulfonates; cationic surfactants such as fatty acid amine salts, quaternary ammonium salts, sulfonium salts, and phosphonium; and nonionic surfactants such as polyoxyethylene alkyl ethers, polyoxyethylene alkyl esters, sorbitan alkyl esters, and polyoxyethylene sorbitan alkyl esters. It is needless to say that these surfactants function as surfactants when they are added to ink compositions.

Surfactant

The ink composition according to the invention may contain a surfactant. By using the surfactant, an image having excellent gloss can be provided to a recording medium whose surface is coated by a resin for receiving ink and also to a recording medium such as photographic paper in which gloss is more valued. Especially, even when a recording medium whose reception layer on the surface has a coated layer for receiving oil-based ink, such as printing paper, is used, bleed (bleeding) of colors can be prevented, and also whitening caused by reflected light, which occurs with an increase in the adhesion amount of ink, can be prevented.

The surfactant used in the invention is preferably a polyorganosiloxane-based surfactant, which can increase the permeability of ink by increasing wettability to a recording medium surface when a recording image is formed. When the polyorganosiloxane-based surfactant is used, since the above-described slightly water-soluble alkanediol is contained, the solubility of the surfactant into the ink is increased to prevent occurrence of insoluble matter or the like, and thereby an ink composition excellent in discharge stability can be provided.

The polyorganosiloxane surfactant is not particularly limited but preferably has a dynamic surface tension of 26 mN/m or less at 1 Hz when prepared in an aqueous solution containing 20% by mass of glycerin, 10% by mass of 1,2-hexanediol, 0.1% by mass polyorganosiloxane surfactant, and 69.9% by mass water. The dynamic surface tension can be measured with, for example, a bubble pressure tensiometer BP2 (manufactured by KRUSS GmbH).

As the surfactant described above, those that are commercially available may be used. For example, OLFINE PD-501 (manufactured by Nissin Chemical Industry Co., Ltd.), OLFINE PD-570 (manufactured by Nissin Chemical Industry Co., Ltd.), BYK-347 (manufactured by BYK-Chemie), and BYK-348 (manufactured by BYK-Chemie) can be used.

Furthermore, the polyorganosiloxane-based surfactant more preferably contains one or more compounds represented by the following Formula (II):

[Chem. 2]

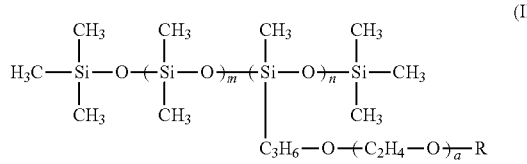

(II)

(in the Formula, R represents a hydrogen atom or a methyl group, a represents an integer of 2 to 13, m represents an integer of 2 to 70, and n represents an integer of 1 to 8), or contains one or more compounds represented by the above Formula (II) wherein R represents a hydrogen atom or a methyl group, a represents an integer of 2 to 11, m represents an integer of 2 to 50, and n represents an integer of 1 to 5. Furthermore, the polyorganosiloxane-based surfactant more preferably contains one or more compounds represented by the above Formula (II) wherein R represents a hydrogen atom or a methyl group, a represents an integer of 2 to 13, m represents an integer of 2 to 50, and n represents an integer of 1 to 5. Furthermore, the polyorganosiloxane-based surfactant more preferably contains one or more compounds represented by the above Formula (II) wherein R represents a hydrogen atom or a methyl group, a represents an integer of 2 to 13, m represents an integer of 2 to 50, and n represents an integer of 1 to 8. Alternatively, the polyorganosiloxane-based surfactant more preferably contains one or more compounds represented by the above Formula (II) wherein R represents a methyl group, a represents an integer of 6 to 18, m represents an integer of 0 to 4, and n represents an integer of 1 to 2 or a compound wherein R represents a methyl group, a represents an integer of 6 to 18, m represents an integer of 0, and n represents an integer of 1. The use of such specific polyorganosiloxane-based surfactants further improves uneven aggregation of ink even in the case of printing on printing paper as a recording medium.

The compound of formula (II) uses a compound where a represents an integer of 2 to 5, m represents an integer of 20 to 40, and n represents an integer of 2 to 4; a compound where a represents an integer of 7 to 11, m represents an integer of 30 to 50, and n represents an integer of 3 to 5; a compound where a represents an integer of 9 to 13, m represents an integer of 2 to 4, and n represents an integer of 1 to 2; a compound where a represents an integer of 6 to 10, m represents an integer of 10 to 20, and n represents an integer of 4 to 8. The use of such compounds further improves uneven aggregation of ink.

The compound of formula (II) preferably uses a compound where R represents a hydrogen atom, a represents an integer of 2 to 5, m represents an integer of 20 to 40, and n represents an integer of 2 to 4; a compound where a represents an integer of 7 to 11, m represents an integer of 30 to 50, and n represents an integer of 3 to 5. The use of such compounds further improves uneven aggregation and bleeding of ink.

The compound of formula (II) preferably uses a compound where R represents a methyl group, a represents an integer of 9 to 13, m represents an integer of 2 to 4, and n represents an integer of 1 to 2; or a compound where a represents an integer of 6 to 10, m represents an integer of 10 to 20, and n represents an integer of 4 to 8. The use of such compounds further improves uneven aggregation and bleeding of ink.

The compound of formula (II) preferably uses a compound where R represents a methyl group, a represents an integer of 6 to 12, m represents an integer of 0, and n represents an integer of 1. The use of such compounds further improves uneven aggregation and bleeding of ink.

The compound of formula (II) preferably uses a mixture of a compound where R represents a hydrogen atom, a represents an integer of 7 to 11, m represents an integer of 30 to 50, and n represents an integer of 3 to 5; a compound where R represents a methyl group, a represents an integer of 9 to 13, m represents an integer of 2 to 4, and n represents an integer of 1 to 2; and a compound where R represents a methyl group, a represents an integer of 6 to 10, m represents an integer of 10 to 20, and n represents an integer of 4 to 8. The use of such compounds further improves uneven aggregation and bleeding of ink.

The compound of formula (II) preferably uses a mixture of a compound where R represents a hydrogen atom, a represents an integer of 7 to 11, m represents an integer of 30 to 50, and n represents an integer of 3 to 5; a compound where R represents a methyl group, a represents an integer of 9 to 13, m represents an integer of 2 to 4, and n represents an integer of 1 to 2; and a compound where R represents a methyl group, a represents an integer of 6 to 18, m represents an integer of 0, and n represents an integer of 1. The use of such compounds further improves uneven aggregation and bleeding of ink.

The polyorganosiloxane surfactant is not particularly limited but preferably has a dynamic surface tension of 26 mN/m or less at 1 Hz when prepared in an ink composition containing 20% by mass of glycerin, 10% by mass of 1,2-hexanediol, 0.1% by mass of a polyorganosiloxane surfactant, and 69.9% by mass water. The dynamic surface tension can be measured with, for example, a bubble pressure tensiometer BP2 (product of KRUSS GmbH).

The amount of the surfactant contained in the ink composition of the invention is preferably 0.01 to 1.0% by mass and more preferably 0.05 to 0.50% by mass. In particular, from the viewpoint of beading, the content of the surfactant when a surfactant with R being a methyl group is used is preferably higher than that when a surfactant with R being a hydrogen atom is used. A surfactant with R being a hydrogen atom is contained at an amount of 0.01 to 0.1% by mass, thereby expressing repellency and controlling bleeding.

In addition, a Gemini-type surfactant can be suitably used as the surfactant used in the invention. The use of the Gemini-type surfactant in combination with the slightly water-soluble alkanediol can uniformly disperse the slightly water-soluble solvent, resulting in a reduction in the initial viscosity of ink. Therefore, the additive amounts of the colorant, the clogging-preventing agent, and other additives into the ink composition can be increased, and, consequently, an image having excellent color reproducibility can be formed on not only plain paper but also a recording medium having a porous surface on which a resin or particles for receiving ink is coated. Especially, even when a recording medium whose reception layer on the surface has a coated layer for receiving oil-based ink, such as printing paper, is used, bleeding (bleed) of colors can be prevented, and also uneven color density caused by ink flow among dots, which occurs with an increase in the adhesion amount of ink, can be prevented. The reason thereof is not clear, but it is thought that the fluidity of the color material is lost because the Gemini-type surfactant forms an extremely stable oil gel with the slightly water-soluble solvent due to the excellent orientation of the Gemini-type surfactant. Therefore, the effect caused by the addition of the Gemini-type surfactant can be higher when the amount of the slightly water-soluble solvent is larger. Here, the term "Gemini-type surfactant" refers to a surfactant having a structure in which two surfactant molecules are connected to each other via a linker.

The Gemini-type surfactant is preferably a two-chain/three-hydrophilic group-type surfactant having a structure in which the hydrophilic group portions of a couple of one-chain type surfactants are connected to each other via a linker having a hydrophilic group. Furthermore, the hydrophilic group portions of the one-chain-type surfactants are preferably acidic amino acid residues, and the linker is preferably a basic amino acid. Specific examples include surfactants having a structure in which each of a couple of one-chain-type surfactants having a hydrophilic group portion of, for example, glutamic acid or aspartic acid is connected to each other via a linker such as arginine, lysine, or histidine. Such a Gemini-type surfactant used in the invention is preferably a surfactant represented by the following Formula (III):

[Chem. 3]

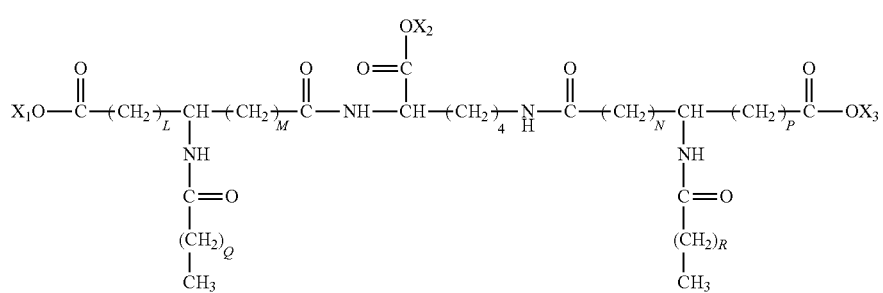

(III)

(in the Formula, $X_1$, $X_2$, and $X_3$ each independently represent a hydrogen atom or an alkali metal, but do not simultaneously represent hydrogen atoms or alkali metals; L and M each independently represent 0 or 2, but do not simultaneously represent 0 or 2; N and P each independently represent 0 or 2, but do not simultaneously represent 0 or 2; Q and R each represent an integer of 8 to 18).

In the above Formula (III), the alkali metal is preferably Na, and Q and R are each preferably around 10. Examples of such compounds include sodium salts of condensation products of N-lauroyl-L-glutamic acid and L-lysine. The compounds represented by the above Formula may be those that are commercially available. For example, Pellicer L-30 (manufactured by Asahi Kasei Chemicals Corp.), which is a 30% aqueous solution of the sodium salt of a condensation product of N-lauroyl-L-glutamic acid and L-lysine, can be suitably used.

In the invention, by using the Gemini-type surfactant, the permeability of ink can be increased by enhancing the wettability to a recording medium surface when a recording image is formed. As a result, uneven aggregation of ink is reduced even in the case of printing on printing paper as a recording medium. In addition, since the ink composition according to the invention contains the slightly water-soluble alkanediol, the solubility of the surfactant into ink is improved to inhibit the generation of insoluble matter or the like. Therefore, an ink composition excellent in the discharge stability can be provided.

The amount of the Gemini-type surfactant contained in the ink composition according to the invention is preferably 0.01 to 1.0% by mass and more preferably 0.05 to 0.50% by mass.

According to preferable embodiments of the invention, the polyorganosiloxane-based surfactants and Gemini-type surfactants can be contained simultaneously. When two surfactants are contained in the ink composition of the invention, high quality images free of bleeding or beading, and further efficient regulation in a case where flowability is different in pigments or resins can be provided.

To the ink composition of the invention may be added other surfactants, specifically acetylene glycol surfactants, anion surfactants, nonionic surfactants, and amphoteric surfactants.

Among them, examples of the acetylene glycol-based surfactant include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyn-3-ol. In addition, the acetylene glycol-based surfactant may be those that are commercially available, and examples thereof include Olfin E1010, STG, and Y (trade names, manufactured by Nissin Chemical Industry Co., Ltd.), Surfynol 61, 104, 82, 465, 485, and TG (trade names, manufactured by Air Products and Chemicals Inc.).

Water and Other Components

The ink composition according to the present invention comprises the above slightly water-soluble alkanediol and cyclodextrin compound and further contains water as a solvent. Water preferably is pure water such as ion exchange water, ultrafiltration water, reverse osmosis water, distillation water or the like, or ultrapure water. These waters, which have been sterilized, for example, by ultraviolet irradiation or by addition of hydrogen peroxide, are particularly preferred because they can prevent the growth of mold or bacteria in the ink composition for a long period of time.

Further, the ink composition according to the present invention preferably comprises a penetrating agent in addition to the above components.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used independently or as a mixture of two or more kinds.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, propylene glycol monomethyl ether, propylene glycol monoethyl ether, propylene glycol monobutyl ether, triethylene glycol monoethyl ether, or triethylene glycol mono-n-butyl ether. More preferred are triethylene glycol monomethyl ether and triethylene glycol mono-n-butyl ether.

The addition amount of the penetrating agent may be properly determined but is preferably about 0.1 to 30% by mass, more preferably about 1 to 20% by weight Preferably, the ink composition according to the present invention further comprises a solubilizer for a recording medium in addition to the above components.

Pyrrolidones such as N-methyl-2-pyrrolidone, pyrrolidone carboxylic acid and alkali metal salts of these can be suitably used as a solubilizer for a recording medium. The addition amount of the solubilizer for a recording medium may be properly determined but is preferably about 0.1 to 30% by mass, more preferably about 1 to 20% by mass.

The ink composition for the invention preferably contains a wetting agent such as glycerin and its derivatives, for example, 3-(2-hydroxyethoxy)-1,2-propanediol (CAS 14641-24-8) or 3-(2-hydroxypropoxy)-1,2-propanediol. Glycerin and its derivatives are preferred from the viewpoint of increase in the clogging recoverability, since they have a function of preventing drying and solidification of inks in ink jet nozzles. In the invention, 0.1 to 8% by mass of wetting agents can be contained.

Nozzle clogging preventives, preservatives, antioxidants, electric conductivity adjustors, pH adjustors, viscosity modifiers, surface tension modifiers, and oxygen absorbers, may be further added to the ink composition according to the present invention For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BND, Proxel GXL, Proxel XL-2, and Proxel Tenn., manufactured by ICI) may be used as preservatives and antimold agents.

Examples of pH adjustors, dissolution aids, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; other phosphates; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: products of Ciba Specialty Chemicals, K.K., for example, Tinuvin 328, 900, 1130, 384, 292, 123, 144, 622, 770, 292, Irgacor 252 153, Irganox 1010, 1076, 1035, MD1024; and lanthanide oxides.

The ink composition according to the present invention can be produced by dispersing and mixing the above components by a suitable method. Preferably, an ink solution is prepared by first mixing the pigment, the polymeric dispersant, and water together with a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water-soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition. The filtration may be preferably performed using a glass fiber filter as filtration materials. The glass fiber may be a resin-impregnated glass fiber from the viewpoint of electrostatic adsorption function. Further, a pore diameter of glass fiber filter is preferably 1 to 40 microns, and more preferably 1 to 10 microns, and this is preferable from the viewpoint of productivity and adsorption removal such as charging isolated resins. Adsorption removal such as charging isolated resins is sufficiently performed and therefore can improve ejecting stability. Examples of the filter include Ultipor GF plus manufactured by Pall Corporation.

The ink composition of the invention is preferably used for an ink jet recording.

Method for Ink Jet Recording

The method for ink jet recording for the ink composition according to the present invention comprises ejecting droplets of the ink composition and depositing the droplets onto a recording medium to perform printing. In this method, a recording medium to be recorded is not particularly limited, and for example includes non- or low absorbable recording media in addition to a recording medium having a plain paper or an aqueous ink-receiving layer.

Non or Low Absorbable Recording Medium

Examples of the non-absorbable recording medium include a plastic film which does not conduct a surface treatment for ink jet recording (that is to say, having no ink-receiving layer), a plastic which is coated or a plastic film which is attached on substrates such as papers. Herein, examples of the plastic include polyvinyl chloride, polyethylene terephthalate, polycarbonate, polystyrene, polyurethane, polyethylene, polypropylene, and the like.

Examples of the low-absorbable recording medium include a coated paper, recording sheet (printing paper) such as a fine coated paper, an art paper, a coat paper, a mat paper, a cast paper.

A coated paper is a paper obtained by applying coating materials on the surface, to increase dense of beauty or smoothes. The coating materials can be prepared by mixing pigments such as talc, pyrophyllite, clay (kaolin), titanium oxide, magnesium carbonate, calcium carbonate, and adhesives such as starch, and polyvinyl alcohol. The coating material is applied using a machine such as a coater in a manufacturing process of paper, or the like. Coaters include an on machine type for a first process, which is paper machining and coating by directly connecting a paper machine, and an off machine type other than paper machining, which is used in recording, "Industrial statistic CLASS" of Ministry of Economy, Trade and Industry is classified into printing coated paper.

Fine coated paper means a recording paper having the amount of coating materials of 12 g/m$^2$ or less. Art paper is a recording paper applying coating materials of about 40 g/m$^2$ to advanced recording paper (high-quality paper, chemical pulp content: 100% of paper). Coated paper is a recording paper applying coating materials of about 20 g/m$^2$ to 40 g/m$^2$. Cast paper means that pressure is applied on the surface of art paper or coat paper in a machine called a cast drum, to thereby form a finished recording paper so as to increase gloss or recording effect.

In the recording method according to the invention, it is preferable to use synthetic paper or printing paper (OKT+: manufactured by Oji Paper Co., Ltd.) as the recording medium having non water absorbability or low water absorbability. Especially, on art paper, paper for high image quality used in POD (print on demand), and exclusive paper for laser printers, in particular, even in a case of low-resolution printing, a high-quality image free from bleeding and beading can be formed. Examples of the paper for high image quality used in POD include Ricoh business coat gloss 100 (manufactured by Ricoh Company, Ltd.). In addition, examples of the exclusive paper for laser printers include LPCCTA4 (manufactured by Seiko Epson Corp.). Examples of the waterproof paper include Kareka (product of Mitsubishi Kagaku Media Co., Ltd.) and Laser Peach (product of Nisshinbo Postal Chemical Co., Ltd.).

EXAMPLES

The invention will be described by Examples in detail, but is not limited to Examples.

Preparation of Ink Composition

Respective components were mixed according to the composition of the following Table 1, and filtered with a 10 μm membrane filter to prepare respective inks. The numerical value in the following Table 1 represents content (% by mass) in ink. Further, resin represents content (% by mass) of solid. Further, trehalose in the following Table 1 is TREHA fine powder manufactured by Hayashibara Shoji Inc. A surfactant in Examples and Comparative Examples is polyorganosiloxane-based surfactant. The surfactant consists of a compound (surfactant (1)) where, in the formula (I), R is a methyl group, a is an integer of 6 to 18, m is an inter of 0, n is an integer of 1; a compound (surfactant (2)) where, in the formula (I), R is a hydrogen atom, a is an integer of 7 to 11, m is an inter of 30 to 50, n is an integer of 3 to 5; a compound (surfactant (3)) where, in the formula (I), R is a methyl group, a is an integer of 9 to 13, m is an inter of 2 to 4, n is an integer of 1 to 2. In the case of an aqueous solution containing 20% by mass of glycerin, 10% by mass of 1,2-hexanediol, 0.1% by mass of the surfactant and 69.9% by mass of water, a dynamic surface tension of the aqueous solution at 1 Hz was 26 mN/m or less. Specifically a dynamic surface tension at 1 Hz (=one bubble/second) was measured using a Bubble Pressure Tensiometer BP2 (manufactured by KRUSS GmbH) so that the dynamic surface tension at 1 Hz in the aqueous solution was 24.6 mN/m.

TABLE 1

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Methyl β-cyclodextrin (*1) | 12 | 12 | 12 | 12 | 6 | 6 | 6 | 6 | 18 | 18 | 18 | 18 |
| 1,2-Octanediol | 1.5 | 1.5 | 1.5 | 1.5 | 1.5 | 1.5 | 1.5 | 1.5 | 3 | 3 | 3 | 3 |
| Glycerin | 4.5 | 0 | 0 | 0 | 4.5 | 0 | 0 | 0 | 4.5 | 0 | 0 | 0 |
| Trehalose | 0 | 0 | 0 | 4.5 | 0 | 0 | 0 | 4.5 | 0 | 0 | 0 | 4.5 |
| Maltotriose (*2) | 0 | 4.5 | 9 | 4.5 | 0 | 4.5 | 9 | 4.5 | 0 | 4.5 | 9 | 4.5 |
| Trimethylolpropane | 4.5 | 4.5 | 4.5 | 4.5 | 4.5 | 4.5 | 4.5 | 4.5 | 4.5 | 4.5 | 4.5 | 4.5 |
| Surfactant (1) | 0.1 | 0.1 | 0.1 | 0.1 | 0.1 | 0.1 | 0.1 | 0.1 | 0.1 | 0.1 | 0.1 | 0.1 |
| Surfactant (2) | 0.1 | 0.1 | 0.1 | 0.1 | 0.1 | 0.1 | 0.1 | 0.1 | 0.1 | 0.1 | 0.1 | 0.1 |
| Surfactant (3) | 0.1 | 0.1 | 0.1 | 0.1 | 0.1 | 0.1 | 0.1 | 0.1 | 0.1 | 0.1 | 0.1 | 0.1 |
| Dispersion liquid (*3) | 54.5 | 54.5 | 54.5 | 54.5 | 54.5 | 54.5 | 54.5 | 54.5 | 54.5 | 54.5 | 54.5 | 54.5 |
| Water | 22.7 | 22.7 | 18.2 | 18.2 | 28.7 | 28.7 | 24.2 | 24.2 | 15.2 | 15.2 | 10.7 | 10.7 |
| Sum | 100 | 100 | 100 | 100 | 100 | 100 | 100 | 100 | 100 | 100 | 100 | 100 |
| Curl property | B | A | A | A | B | A | A | A | B | A | A | A |
| Open system clogging recoverability | A | B | A | A | A | B | A | A | A | B | A | A |
| Closed system clogging recoverability | B | B | B | A | B | B | B | A | B | B | B | A |
| Drying | B | A | A | A | B | A | A | A | B | A | A | A |
| Storage stability (Ink) | A | A | A | A | A | A | A | A | A | A | A | A |
| Film line width | A | A | A | A | A | A | A | A | A | A | A | A |
| Film fixability | B | A | A | A | B | A | A | A | B | A | A | A |
| Beading property in film | A | A | A | A | A | A | A | A | A | A | A | A |
| Bleeding property in film | A | A | A | A | A | A | A | A | A | A | A | A |

TABLE 1-continued

| | | | | | | | | | | | | |
|---|---|---|---|---|---|---|---|---|---|---|---|---|
| Beading property in printing paper | A | A | A | A | A | A | A | A | A | A | A | A |
| Bleeding property in printing paper | A | A | A | A | A | A | A | A | A | A | A | A |

| | Example 13 | Example 14 | Example 15 | Example 16 | Example 17 |
|---|---|---|---|---|---|
| Methyl β-cyclodextrin (*1) | 6 | 6 | 6 | 6 | 6 |
| 1,2-Octanediol | 3 | 3 | 3 | 3 | 3 |
| Glycerin | 4.5 | 0 | 0 | 0 | 0 |
| Trehalose | 0 | 0 | 0 | 4.5 | 9 |
| Maltotriose (*2) | 0 | 4.5 | 9 | 4.5 | 9 |
| Trimethylolpropane | 4.5 | 4.5 | 4.5 | 4.5 | 0 |
| Surfactant (1) | 0.1 | 0.1 | 0.1 | 0.1 | 0.1 |
| Surfactant (2) | 0.1 | 0.1 | 0.1 | 0.1 | 0.1 |
| Surfactant (3) | 0.1 | 0.1 | 0.1 | 0.1 | 0.1 |
| Dispersion liquid (*3) | 54.5 | 54.5 | 54.5 | 54.5 | 54.5 |
| Water | 27.2 | 27.2 | 22.7 | 22.7 | 18.2 |
| Sum | 100 | 100 | 100 | 100 | 100 |
| Curl property | B | A | A | A | A |
| Open system clogging recoverability | A | B | A | A | A |
| Closed system clogging recoverability | B | B | B | A | A |
| Drying | B | A | A | A | A |
| Storage stability (Ink) | B | B | B | B | A |
| Film line width | A | A | A | A | A |
| Film fixability | B | A | A | A | A |
| Beading property in film | A | A | A | A | A |
| Bleeding property in film | A | A | A | A | A |
| Beading property in printing paper | A | A | A | A | A |
| Bleeding property in printing paper | A | A | A | A | A |

| | Comparative Example 1 | Comparative Example 2 | Comparative Example 3 | Comparative Example 4 | Comparative Example 5 | Comparative Example 6 |
|---|---|---|---|---|---|---|
| Methylated β-cyclodextrin (*1) | 0 | 0 | 0 | 0 | 0 | 18 |
| Triethyleneglycol monomethyl ether | 0 | 0 | 0 | 0 | 18 | 0 |
| 1,2-Octanediol | 3 | 3 | 3 | 3 | 3 | 0 |
| 1,2-Hexanediol | 0 | 0 | 0 | 0 | 0 | 3 |
| Glycerin | 4.5 | 0 | 0 | 0 | 0 | 0 |
| Trehalose | 0 | 0 | 0 | 4.5 | 4.5 | 4.5 |
| Maltotriose (*2) | 0 | 4.5 | 9 | 4.5 | 4.5 | 4.5 |
| Trimethylolpropane | 4.5 | 4.5 | 4.5 | 4.5 | 4.5 | 4.5 |
| Surfactant (1) | 0.1 | 0.1 | 0.1 | 0.1 | 0.1 | 0.1 |
| Surfactant (2) | 0.1 | 0.1 | 0.1 | 0.1 | 0.1 | 0.1 |
| Surfactant (3) | 0.1 | 0.1 | 0.1 | 0.1 | 0.1 | 0.1 |
| Dispersion liquid (*3) | 54.5 | 54.5 | 54.5 | 54.5 | 54.5 | 54.5 |
| Water | 33.2 | 33.2 | 28.7 | 28.7 | 10.7 | 10.7 |
| Sum | 100 | 100 | 100 | 100 | 100 | 100 |
| Curl property | B | A | A | A | A | A |
| Open system clogging recoverability | A | B | A | A | A | A |
| Closed system clogging recoverability | B | B | B | A | A | A |
| Drying | B | A | A | A | A | A |
| Storage stability (Ink) | C | C | C | C | C | B |
| Film line width | C | C | C | C | B | C |
| Film fixability | B | B | B | B | B | A |
| Beading property in film | B | B | B | B | A | B |
| Bleeding property in film | C | C | C | C | B | B |
| Beading property in printing paper | B | B | B | B | A | B |
| Bleeding property in printing paper | C | C | C | C | B | B |

(*1): trade name: CAVASOL(R) W7M (manufactured by Wacker Corporation)
(*2): trade name: OLIGOTOSE (manufactured by SANWA CORNSTARCH CO., LTD)
(*3): in a dispersion liquid, 11% by mass of pigment, 2.2% by mass of styrene acrylic acid copolymer, 2.2% by mass fluorene resin, 1.1% by mass 1,6-hexanediol are contained and the remainder is water.

In the following ink set of Table 1, "Y" contains C.I. Pigment Yellow 74 as a pigment, "M" contains C.I. Pigment Violet 19 as a pigment, "C" contains C.I. Pigment Blue 15:3 as a pigment, and "K" contains C.I. Pigment Black 7 as a pigment.

"Duty" used below is a value calculated by the following formula.

Duty (%) = actual recording dot number/(longitudinal resolution×lateral resolution)×100 (in formula, "actual dot number" is actual recording dot number per unit area, "longitudinal resolution" and "lateral resolution" are resolution per unit area respectively.)

Evaluation

Evaluation of Preservation Stability

Viscosity at 20° C. of the above-prepared ink Y, M, C, and K was measured as an ignition viscosity. Then, 100 g of each ink was charged into a 110 mL Laboran sample bottle (manufactured by Aspen Corporation), and tapped. After leaving to stand at 70° C. for 1 hour, it was cooled to 20° C. Left viscosity at 20° C. of the ink was measured as a left viscosity.

A: viscosity change is less than 0.4 mPas

B: viscosity change is equal to or more than 0.4 mPas and less than 0.8 mPas

C: viscosity change is equal to or more than 0.8 mPas.

Evaluation of Film Line Width

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image at the main scanning direction of 720×180 dpi was recorded at 720×360 dpi to Rumira S10 (100 micron thickness) (manufactured by Toray Corporation). A temperature of the medium at the time of recording was 37° C. In addition, the distance between the recording sheet and the recording head was 1 mm.

The resulting lines were evaluated in accordance with the following criteria:

A: line width is equal to or more than 60 microns and less than 70 microns

B: line width is equal to or more than 70 microns.

C: line was not obtained due to discharge failure.

The results were as shown in Table 1.

Evaluation of Film Fixability

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 1440×720 dpi was recorded at 720×360 dpi to Rumira S10 (100 micron thickness) (manufactured by Toray Corporation). A temperature of the medium at the time of recording was 37° C.

In addition, the distance between the recording sheet and the recording head was 1 mm.

The recorded image was an image of a first color of monochromatic colors of duty 100%. The adhesion amount was about 3.1 mg/inch$^2$.

The recording image was left to stand in an environment at 20° C. and 40% humidity for 24 hours and scrubbed with nails.

The resulting images were evaluated in accordance with the following criteria:

A: color materials of portion which is scrubbed with nails is not peeled

B: color materials of portion which is scrubbed with nails is peeled

The results were as shown in Table 1.

Clogging Recoverability of High Temperature and Lows Humidity Open System (Open System Clogging Recoverability)

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted. A cartridge is transferred to an exchange position of an ink cartridge, and concent was pulled off, the ink cartridge was removed, and then a head was removed. Thus, the ink cartridge and head cap were removed, and then the head was left to stand in an environment at 40° C./humidity 20% for 3 days.

After being left to stand, the head left in the carriage was equipped as described above, further, the ink cartridge left to stand in an environment at constant temperature and constant humidity was equipped as described above, cleaning operation was repeated until all nozzles ejected in the same manner as an initial state, and ease of recoverability was evaluated in accordance with the following criteria:

A: cleaning operation is repeated and clogging is recovered within 12 times

B: cleaning operation is repeated and clogging is not recovered within 12 times

The results are as shown in Table 1.

Clogging Recoverability of High Temperature and Constant Humidity Closed System (Closed System Clogging Recoverability)

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted. Then, according to a general process, a switch was pressed on, current was stopped, followed by pulling out the plug. Thus, a printer was left to stand in an environment at 40° C./humidity 45% for 7 days without removing an ink cartridge and a head cap.

After being left to stand, current was applied to a printer, cleaning operation was repeated until all nozzles ejected in the same manner as an initial state, and ease of recoverability was evaluated in accordance with the following criteria:

A: cleaning operation is repeated and clogging is recovered within 12 times

B: cleaning operation is repeated and clogging is not recovered within 12 times

The results were as shown in Table 1.

Evaluation of Ink Beading (Image Quality) in Film (Beading Property)

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 1440×720 dpi was recorded at 720×360 dpi to Rumira S10 (100 micron thickness) (manufactured by Toray Corporation). On this occasion, the adhesion amount of the ink of a monochromatic color of duty 100% was about 3.1 mg/inch$^2$. A temperature of the medium at the time of recording was 37° C.

In addition, the distance between the recording sheet and the recording head was 1 mm.

The recorded image was an image of a secondary color obtained by mixing monochromatic colors of the same duty.

The resulting images were evaluated in accordance with the following criteria:

A: Up to a secondary color of duty 160% of each monochromatic color of duty 80% was reproduced without beading;
B: Up to a secondary color of duty 120% of each monochromatic color of duty 60% was reproduced without beading, but up to a secondary color of duty 160% of each monochromatic color of duty 80% was not reproduced without beading.

The results were as shown in Table 1.

Evaluation of Ink, Bleeding (Image Quality) in Film (Bleeding Property)

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 1440×720 dpi was recorded at 720×360 dpi to Rumira S10 (100 micron thickness) (manufactured by Toray Corporation). On this occasion, the adhesion amount of the ink of a monochromatic color of duty 100% was about 3.1 mg/inch$^2$. A temperature of the medium at the time of recording was 37° C.

In addition, the distance between the recording sheet and the recording head was 1 mm.

The recorded image was an image in which 2 to 8 pixel lines of a primary color of duty 80% were in contact with a secondary color of duty 160% of each duty 80%.

The resulting images were evaluated in accordance with the following criteria:

A: 6/720 inch line was reproduced without bleeding but 2/720 inch line was not reproduced with bleeding
B: 10/720 inch line was reproduced without bleeding but 6/720 inch line was not reproduced with bleeding
C: line was not obtained due to discharge failure The results were as shown in Table 1.

Evaluation of Drying

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 1440×720 dpi was recorded at 720×360 dpi to Rumira S10 (100 micron thickness) (manufactured by Toray Corporation). A temperature of the medium at the time of recording was 37° C.

In addition, the distance between the recording sheet and the recording head was 1 mm.

The recorded image was an image of a first color of monochromatic colors of duty 100%. The adhesion amount was about 3.1 mg/inch$^2$.

The recording image was left to stand in an environment at 20° C. and 40% humidity for 10 minutes and scrubbed with the fingers.

The resulting images were evaluated in accordance with the following criteria:

A: coloring materials does not smudge fingers
B: coloring materials smudges fingers The results were shown in Table 1.

Evaluation of Ink Beading (Image Quality) in Printing Paper (Beading Property)

An ink set composed of the above-prepared inks Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 7 ng, and a solid image of 720×720 dpi was recorded at 720×360 dpi per driving on OKT+ of about 73.3 g/m$^2$ (manufactured by Oji Paper Co., Ltd.). On this occasion, the adhesion amount of the ink of a monochromatic color of duty 100% was about 3.1 mg/inch$^2$. A temperature of the medium at the time of recording was 20° C.

In addition, the distance between the recording sheet and the recording head was 1 mm. The recorded image was an image of a secondary color obtained by mixing monochromatic colors of the same duty.

The resulting images were evaluated in accordance with the following criteria:

A: Up to a secondary color of duty 160% of each monochromatic color of duty 80% was reproduced without beading;
B: Up to a secondary color of duty 120% of each monochromatic color of duty 60% was reproduced without beading, but up to a secondary color of duty 160% of each monochromatic color of duty 80% was not reproduced without beading.

The results were shown in Table 1.

Evaluation of Ink Bleeding (Image Quality) in Printing Paper (Bleeding Property)

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted.

A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 7 ng, and a solid image of 720×720 dpi was recorded at 720×360 dpi per driving on OKT+ of about 73.3 g/m² (manufactured by Oji Paper Co., Ltd.). On this occasion, the adhesion amount of the ink of a monochromatic color of duty 100% was about 3.1 mg/inch². A temperature of the medium at the time of recording was 20° C.

In addition, the distance between the recording sheet and the recording head was 1 mm. The recorded image was an image in which 2 to 8 pixel lines of a primary color of duty 80% were in contact with a secondary color of duty 160% of each duty 80%.

The resulting images were evaluated in accordance with the following criteria:

A: 6/720 inch line was reproduced without bleeding but 2/720 inch line was not reproduced with bleeding B: 10/720 inch line was reproduced without bleeding but 6/720 inch line was not reproduced with bleeding C: line was not obtained due to discharge failure The results were as shown in Table 1.

Curl Evaluation

An ink set composed of the above-prepared ink Y, M, C, and K was filled and installed in the ink cartridge of an ink jet printer (PXG930, manufactured by Seiko Epson Corp.). An installation order was YYMMCCKK as an order separated from a cap. Then, it was confirmed that ink could be filled to a head of the printer using a printer driver and recording was generally conducted. A recording method was performed so that recording could be performed at 720 dpi in the main scanning (head driving) direction and at 360 dpi in the sub-scanning (recording medium transporting) direction. Then, the voltage applied to a piezo element of the printer head was adjusted such that the dot size at the time of landing was about 3 ng, and a solid image of 720×720 dpi was recorded at 720×360 dpi per driving on OKT+ of about 73.3 g/m² (manufactured by Oji Paper Co., Ltd.). A recording matter was a solid image with 6 mm blank at the periphery thereof. Recording was conducted in an environment at a constant temperature and constant humidity (25° C., 45% humidity). On this occasion, the adhesion amount of the ink of a monochromatic color of duty 100% was about 1.6 mg/inch². The resultant recording matter where the recording plane was directed to an upper portion was left to stand on an even desk in an environment of constant temperature and constant humidity (25° C., 45% humidity) for 3 days. A recording image was monochromatic color. Further, a temperature of the medium at the time of recording was 20° C.

In addition, the distance between the recording sheet and the recording head was 1 mm.

The resulting images were evaluated in accordance with the following criteria:

A: average value of curling to edges of four corners of paper from a desk is less than 20 mm.

B: average value of curling to edges of four corners of paper from a desk is equal to or more than 20 mm.

The results were as shown in Table 1.

An ink composition and ink set of respective Examples were obtained in the similar manner except that 1,6-hexanediol as a resin dissolving agent which is contained at the time of preparing a dispersion liquid was changed to 1,2-hexanediol. Further, these were evaluated in the similar manner to the aforementioned method. Evaluation results were the same as described above even when 1,6-hexanediol was changed to 1,2-hexanediol.

An ink composition and ink set of respective Examples were obtained in the similar mariner except that styrene acryl copolymer of the dispersion resin which is contained at the time of preparing a dispersion liquid was changed to oxyethyl resin. Further, evaluation was performed in the similar manner to the aforementioned method.

Evaluation results were the same as described above even when the styrene acryl copolymer was changed to oxyethyl resin.

What is claimed is:

1. An ink composition comprising:
    a slightly water-soluble alkanediol having 7 to 10 carbon atoms, and
    cyclodextrin compound,
        wherein the cyclodextrin compound has one or more substituents, and a solubility in water at 25° C. of 30% by mass or more.

2. The ink composition according to claim 1, wherein the cyclodextrin compound is methylated β-cyclodextrin and is contained at 6.0 to 18.0% by mass relative to the ink composition.

3. The ink composition according to claim 1, wherein the ratio of the slightly water-soluble alkanediol content to the cyclodextrin compound content is 1:4 to 1:8.

4. The ink composition according to claim 1, further comprising a solid wetting agent which is solid at 20° C. and a relative humidity of 60%.

5. The ink composition according to claim 4, wherein the solid wetting agent contains one or more kinds selected from the group consisting of a first saccharide, a second saccharide, and trimethylolalkanes, and
    wherein the first saccharide is one or more kinds selected from the group consisting of trehalose, isotrehalose, neotrehalose, and mannitol,
    the second saccharide is one or more kinds selected from the group consisting of maltotriose, maltotetraose, and maltopentaose, and
    the trimethylolalkanes are trimethylolethane and/or trimethylolpropane.

6. The ink composition according to claim 4, wherein the solid wetting agent is two or more kinds selected from the group consisting of trimethylolpropane, trehalose, and maltotriose.

7. The ink composition according to any of claim 4, wherein the solid wetting agent is contained at 4.5 to 13.5% by mass relative to the ink composition.

* * * * *